(12) United States Patent
Lambert

(10) Patent No.: US 11,985,103 B1
(45) Date of Patent: May 14, 2024

(54) ELECTRONIC MESSAGE CLIENT INCLUDING DYNAMIC PRIORITIZATION BASED ON SENDER FEATURES AND SERIAL UNDO FUNCTIONALITY

(71) Applicant: Mark Lambert, Tarpon Springs, FL (US)

(72) Inventor: Mark Lambert, Tarpon Springs, FL (US)

(73) Assignee: Mark Lambert, Tarpon Springs, FL (US)

( * ) Notice: Subject to any disclaimer, the term of this patent is extended or adjusted under 35 U.S.C. 154(b) by 0 days.

(21) Appl. No.: 18/186,093

(22) Filed: Mar. 17, 2023

(51) Int. Cl.
| | | |
|---|---|---|
| *H04L 51/216* | (2022.01) | |
| *G06F 3/04883* | (2022.01) | |
| *H04L 51/212* | (2022.01) | |
| *H04L 51/222* | (2022.01) | |

(52) U.S. Cl.
CPC ........ *H04L 51/216* (2022.05); *G06F 3/04883* (2013.01); *H04L 51/212* (2022.05); *H04L 51/222* (2022.05)

(58) Field of Classification Search
CPC .......................... H04L 51/216; H04L 51/212
See application file for complete search history.

(56) References Cited

U.S. PATENT DOCUMENTS

| | | |
|---|---|---|
| 6,732,155 B2 | 5/2004 | Meek |
| 7,219,302 B1 | 5/2007 | Oshaughnessy et al. |
| 7,413,085 B2 | 8/2008 | Zager et al. |
| 8,392,409 B1* | 3/2013 | Kashyap ............. G06Q 10/107 707/723 |
| 2002/0138581 A1 | 9/2002 | Macintosh et al. |
| 2003/0093483 A1 | 5/2003 | Allen et al. |
| 2003/0135565 A1 | 7/2003 | Estrada |
| 2003/0233419 A1 | 12/2003 | Beringer |
| 2005/0043015 A1 | 2/2005 | Muramatsu |
| 2005/0257159 A1 | 11/2005 | Keohane et al. |
| 2005/0267944 A1 | 12/2005 | Little |
| 2006/0072723 A1 | 4/2006 | Chung |
| 2006/0080278 A1 | 4/2006 | Neiditsch et al. |
| 2006/0155810 A1 | 7/2006 | Butcher |
| 2006/0248155 A1 | 11/2006 | Bondarenko et al. |
| 2007/0061400 A1 | 3/2007 | Parsons |
| 2008/0046518 A1 | 2/2008 | Tonnison et al. |
| 2008/0147818 A1 | 6/2008 | Sabo |
| 2008/0183824 A1 | 7/2008 | Chen et al. |
| 2008/0235335 A1 | 9/2008 | Hintermeister et al. |
| 2008/0276171 A1 | 11/2008 | Sabo |
| 2011/0119258 A1* | 5/2011 | Forutanpour ........... H04L 51/48 707/723 |

(Continued)

FOREIGN PATENT DOCUMENTS

| | | |
|---|---|---|
| CN | 1588414 A | 3/2005 |
| DE | 102005041369 B3 | 1/2007 |

(Continued)

*Primary Examiner* — Caroline H Jahnige
(74) *Attorney, Agent, or Firm* — Perkins Coie LLP; Alberto Araiza

(57) ABSTRACT

The disclosed technologies address problems that users face when using email applications. Various embodiments generally relate to systems and methods for organizing and prioritizing emails in an email application so that a user has greater control over a display of email messages.

20 Claims, 13 Drawing Sheets

(56) References Cited

U.S. PATENT DOCUMENTS

| | | | |
|---|---|---|---|
| 2012/0221961 A1* | 8/2012 | Reynolds | H04L 51/212 |
| | | | 715/752 |
| 2015/0012208 A1 | 1/2015 | Abrams | |
| 2015/0088784 A1* | 3/2015 | Dhara | G06N 5/02 |
| | | | 706/11 |
| 2015/0339373 A1* | 11/2015 | Carlson | H04L 51/04 |
| | | | 707/737 |
| 2016/0011757 A1 | 1/2016 | Hoffman | |
| 2019/0146650 A1* | 5/2019 | Shah | H04L 67/02 |
| | | | 715/752 |
| 2020/0026352 A1* | 1/2020 | Wang | G06F 3/044 |
| 2020/0236081 A1* | 7/2020 | Lukas | G06F 3/0488 |
| 2022/0158962 A1 | 5/2022 | Antonov et al. | |
| 2022/0377041 A1* | 11/2022 | Lukas | G06F 3/0485 |

FOREIGN PATENT DOCUMENTS

| | | | | |
|---|---|---|---|---|
| EP | 1464014 A1 | 10/2004 | | |
| EP | 1717743 A1 | 11/2006 | | |
| EP | 1774708 A1 | 4/2007 | | |
| FR | 3026504 A1 * | 4/2016 | ………… | G06F 3/0488 |
| JP | 2006350772 A | 12/2006 | | |
| KR | 20060058903 A | 6/2006 | | |
| KR | 20070057570 A | 6/2007 | | |
| WO | 2007137323 A2 | 12/2007 | | |

* cited by examiner

ELECTRONIC MESSAGE CLIENT INCLUDING DYNAMIC PRIORITIZATION BASED ON SENDER FEATURES AND SERIAL UNDO FUNCTIONALITY

BACKGROUND

An email client, email reader or, more formally, message user agent or mail user agent is a computer program used to access and manage a user's email. A web application which provides message management, composition, and reception functions can act as a web email client, and a piece of computer hardware or software whose primary or most visible role is to work as an email client can also use the term.

Like most client programs, an email client is only active when a user runs it. The common arrangement is for an email user (the client) to arrange with a remote Mail Transfer Agent (MTA) server for the receipt and storage of the client's emails. The MTA, using a suitable mail delivery agent, adds email messages to a client's storage as they arrive.

Small portable devices like smartphones are increasingly used to check email while traveling and to make brief replies. Larger devices with better keyboard access are used to reply at greater length. Messages are presented on the devices with headers, as well as the sender and the subject. The devices need to request to download specific messages. Virtually all modern e-mail clients and servers support IMAP (Internet Message Access Protocol), which along with the earlier POP3 (Post Office Protocol) are the two most prevalent standard protocols for email retrieval. Many webmail service providers such as Gmail and Outlook.com also provide support for both IMAP and POP3.

BRIEF DESCRIPTION OF THE DRAWINGS

Detailed descriptions of implementations of the present invention will be described and explained through the use of the accompanying drawings.

Figure 1:
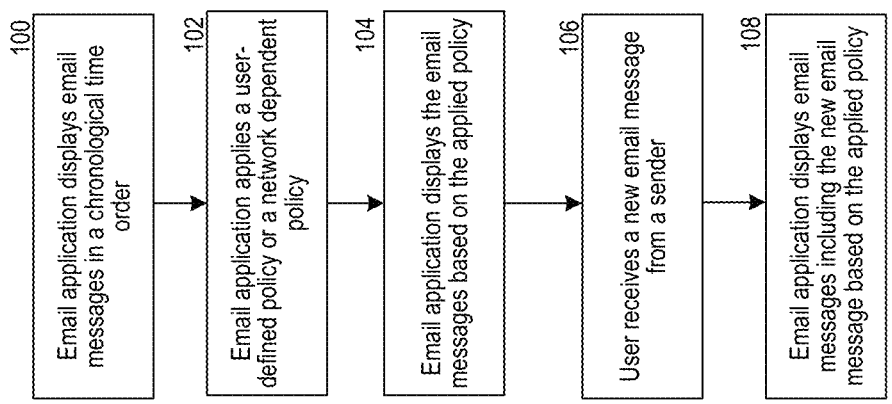
FIG. 1 is a flowchart of an embodiment of a process for displaying email messages based on an applied policy.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technologies address problems that users face when using email applications. Various embodiments generally relate to systems and methods for organizing and prioritizing emails in an email application so that a user has greater control over a display of email messages. In one embodiment, the user is able to serially undo the last functions performed by the user in the email application. The functions that can be undone include functions performed within the application, such as moving a message from one folder to another, deleting a message, marking a message as spam, etc. By having an undo function, the user can stay on the inbox or a particular folder the user is browsing without having to navigate away to another and navigate back to the original inbox/folder. The undo feature is implemented into the mail application in a permanent icon, allowing the user to backtrack multiple performed actions and undo multiple functions.

In another embodiment, the user is provided a list of contacts within a certain physical distance from the user. Additionally, the user is able to sort and view emails based on distance of contacts from the user. The user has an option to turn the feature on and off, similar to how some mobile applications allow users to control when to share their locations. When the feature is turned on, the user can receive distance information of any contact who also has the feature turned on. The user also has an option in the email application to prioritize displaying emails from contacts located near the user.

In another embodiment, the user can assign top contacts a color so that emails from top contacts are easily distinguished. This is done by color-coding emails received from designated contacts. Additionally, emails received by a particular top contact have a different shade or depth of color compared to emails sent to that particular top contact. This is to help the user distinguish between received emails and sent emails when the user performs a generic search of an email associated with the top contact in the email application.

In another embodiment, the user can pin all emails from a designated contact. All emails from the designated contact would appear on top of an inbox in the email application. The email application allows the user to assign multiple contacts with different priorities assigned such that all emails from one contact appears on top followed by all emails from another contact, then by emails from the rest of the contacts. Additionally, in other embodiments, the email application allows the user to pin emails based on other pre-assigned indicators such as subject of email or existence of attachments.

In another embodiment, the user can also search for emails, and the file or computer locations of the emails associated with search results are presented to the user. The search terms can include the sender, subject of email, date of email, etc. By displaying the locations of the emails, the user can take appropriate action if emails are located in undesired locations (e.g., wrong folder).

One or more of the embodiments can be used together to enhance the user's experience of organizing and prioritizing emails in the email application.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

FIG. 1 is a flowchart of an embodiment of a process for displaying email messages based on an applied policy. At 100, an email application displays email messages in a chronological time order. The display is a vertical list of the email messages, with newer email messages appearing above older email messages. Each email message in the vertical list is associated with multiple data tags. Examples of data tags include sender information, subject of the email message, graphical icons indicating importance of email message, date of receipt, and folder location of the email message. In some embodiments, the email application displays one or more of the data tags in the email messages so that the user can gain greater understanding of the email messages.

At 102, the email application applies a user-defined policy or a network dependent policy to display email messages. Examples of user-defined policies include assigning different colors to designated contacts so that email messages from designated contacts stand out from other email messages and assigning pin rules to contacts that email messages from designated contacts are pinned above other email messages. An example of a network dependent policy is determining locations of contacts relative to the user and displaying the email messages from contacts who are closest in distance from the user.

At 104, after receiving a user command to apply a user-defined policy or a network dependent policy, the email application displays the email messages based on the applied policy. How the email application displays the email messages based on the applied policy is discussed in embodiments below.

At 106, the user receives a new email message from a contact. Because a user-defined policy or a network dependent policy is applied, at 108, the email application sorts and displays email messages including the new email message based on the applied policy.

Figure 2:
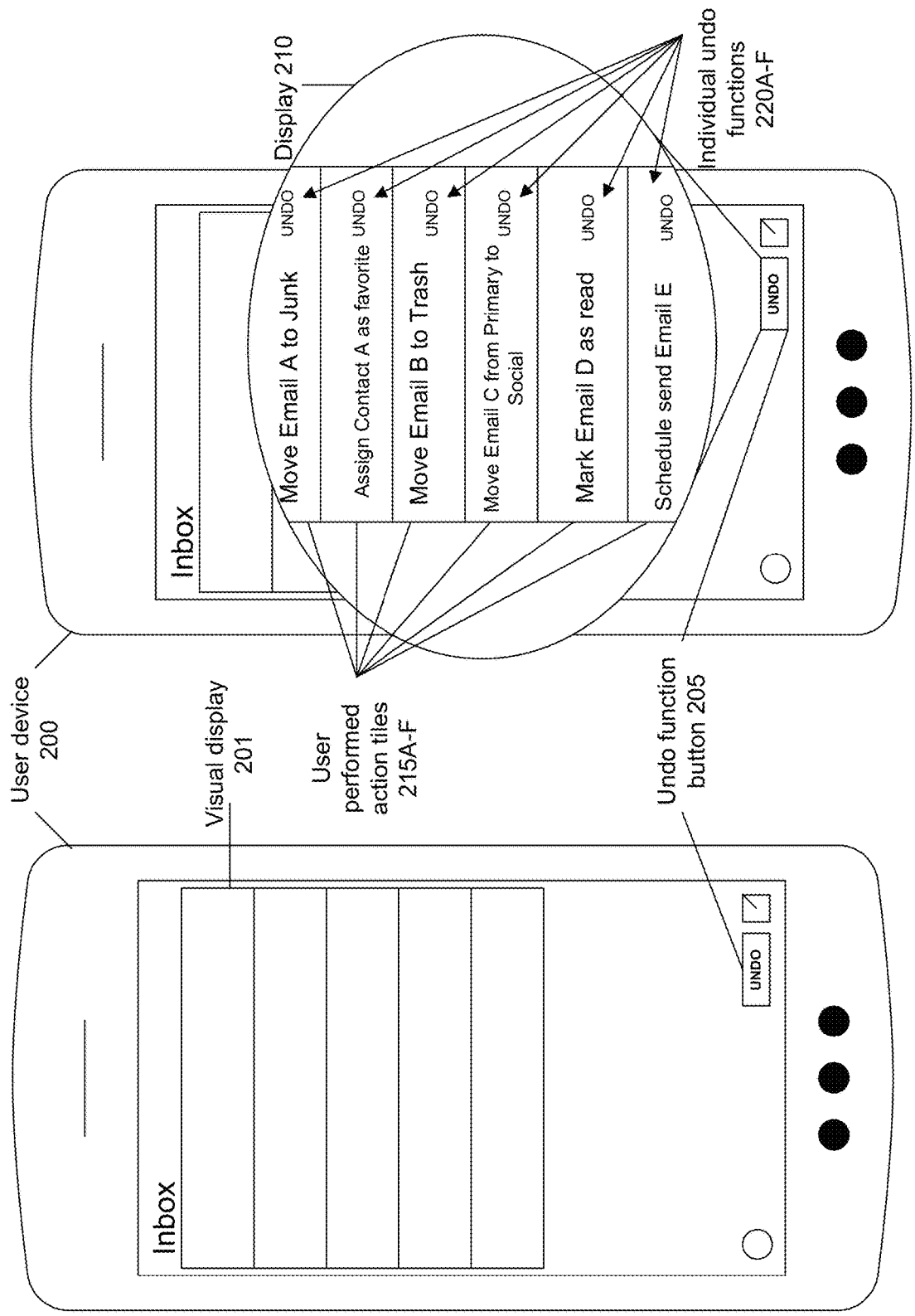
FIGS. 2A and 2B illustrate the ability to undo a user performed action in an email application.

FIGS. 2A and 2B illustrate the ability to undo a user performed action in an email application. A user device 200, such as a mobile phone, enables a user to manage email using an email application. FIG. 2A illustrates an embodiment where an undo function button 205 is permanently located on the bottom right of the email application. The email application displays multiple email messages on a visual display 201 of the user device 200. When the user touches the undo function button 205 using the user device 200, the email application undoes the last action performed by the user in the email application. Examples of an action performed by the user in the application include moving an email message from one folder to another folder, moving an email message to trash or spam, marking an email message as read, blocking a contact, or scheduling an email message to be sent at a later time.

In some embodiments, the email application stores in a memory only the last action performed by a user. In such cases, upon undoing the last action performed by the user in response to the user touching the undo function button 205, subsequent touch of the undo function button 205 undoes the undoing action. This is because the last action performed by the user was undoing of the user performed action.

In other embodiments, such as in FIG. 2B, the email application can store a record of a series of user performed actions in the memory. In FIG. 2B, when the user touches the undo function button 205, the email application presents a display 210 of a list of user performed actions. The size of the list of user performed actions depends on the memory capacity associated with the email application. In some embodiments, the user can configure the size of the list of user performed actions. In the display 210, the user can view user performed action tiles 215A, 215B, 215C, 215D, 215E, and 215F indicating actions most recently performed by the user. Next to the user performed action tiles 215A-F are individual undo function buttons 220A-F associated with the user performed actions of the user performed action tiles 215A-F, respectively. Upon touching an individual undo function, the email application undoes the user performed action associated with the individual undo function. After completing desired actions, the user can return to the visual display 201 that displays email messages by touching the undo function button 205.

In other embodiments, the email application is capable of storing a record of a series of user performed actions in the memory but is unable to present a display of a list of user performed actions. Touching the undo function button 205 prompts the email application to undo the last user performed action. Subsequent touch of the undo function button 205 prompts the email application to undo the second to last user performed action stored in the memory. The email application repeats the undo process in response to subsequent touches until the email application runs out of user performed actions to undo. For example, in an email application having memory capacity of storing three user performed actions, a user first deletes email A, marks email B as important, then blocks contact C. First touch of the undo function button 205 unblocks contact C, which is the latest user performed action in the memory. Second touch of the undo function button 205 unmarks email B as important, and third touch of the undo function 205 moves the deleted email A back to its origination. Subsequent touches will not undo a user performed action because the email application has run out of user performed actions to undo.

Figure 3:
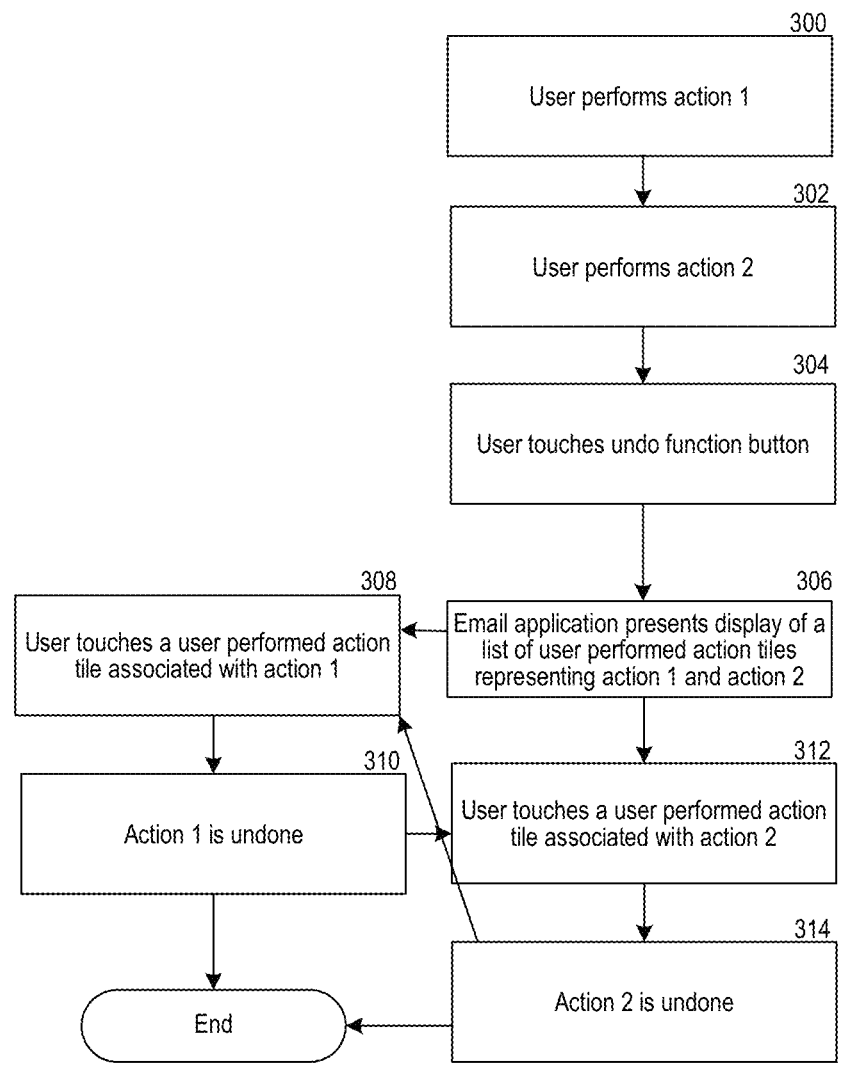
FIG. 3 is a flowchart of an embodiment of a process for undoing a user performed action in an email application.

FIG. 3 is a flowchart of an embodiment of a process for undoing a user performed action in an email application. In this embodiment, the email application is capable of storing a record of multiple user-performed actions in the memory. At 300, a user performs an action 1 in an email application. Examples of an action performed by the user in the application include moving an email message from one folder to another folder, moving an email message to trash or spam, marking an email message as read, blocking a contact, or scheduling an email message to be sent at a later time.

At 302, the user performs an action 2. At 304, the user touches the undo function button in the email application on a visual display of a user device. At 306, upon detecting the touch input by the user, the email application presents a display of a list of user performed action tiles representing action 1 and action 2 performed by the user. The block 308 illustrates a scenario where the user touches a user performed action tile associated with action 1. At 310, in response to the touch input, the email application undoes action 1. The block 312 illustrates a scenario where the user touches a user performed action tile associated with action 2. At 314, in response to the touch input, the email application undoes action 2. The user may choose to perform both 308 and 312, upon which the email application undoes both actions 1 and 2.

In some embodiments, the user is able to determine how far back the list of user performed action tiles representing actions to be undone are displayed. For example, in an email application with a memory capable of saving ten user performed actions, the user is able to choose any number from one to ten to designate the number of user performed action tiles to display in the list.

Figure 4:
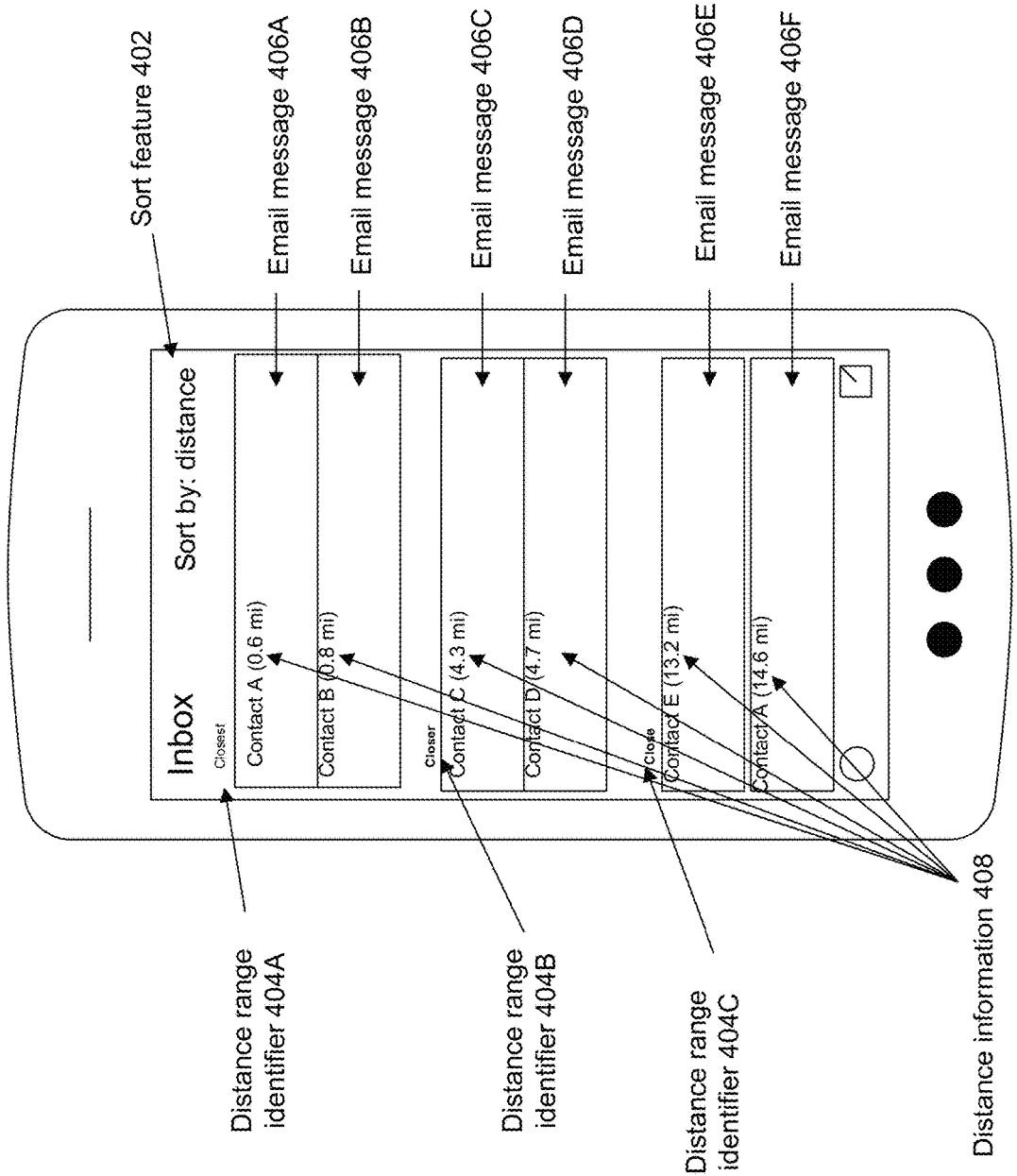
FIG. 4 illustrates the ability to display email messages based on locations of email senders.

FIG. 4 illustrates the ability to display email messages based on physical locations of email senders. In some embodiments, the email application includes a sort feature 402 that allows a user to sort email messages in various orders. The email application sorts and displays the email messages in a chronological time order by default. When the email application receives a user command to sort email messages by distance, the email application applies a network dependent policy to change the display of the email messages.

The email application first determines locations of senders of the email messages. The email application periodically receives location information from users who turn on a location service. The email application sorts and displays email messages using distance range identifiers 404A, 404B, and 404C, prioritizing display of email from identified senders who are closest in distance from the user device. The user can adjust distance ranges of the distance range identifiers 404A-C. For example, the user may assign a rule so that email messages from senders who are within 1 mile from the user device are displayed under the distance range identifier 404A, email messages from senders who are between 1 and 5 miles from the user device are displayed under the distance range identifier 404B, and email messages from senders who are more than 5 miles away from the user device are displayed under the distance range identifier 404C. In some embodiments, email messages from senders whose location information is unknown are displayed below email messages from senders whose location information is known. In other embodiments, email messages 406A-F display distance information 408 next to identified senders who have the location service turned on. The email application dynamically updates the display of email messages based on a location information feed to the user device via the location service. For example, the email application updates the display of email messages based on the location fed to the user device every minute. Messages from Contact A, who was within 1 mile of the user device the last time the email application received the location feed, were originally displayed under the distance range identifier 404A. Subsequently, the email application receives a new location feed identifying Contact A as being 3 miles away from the user device. The email application dynamically updates the display of email messages by now displaying the messages from Contact A under the distance range identifier 404B.

Figure 5:
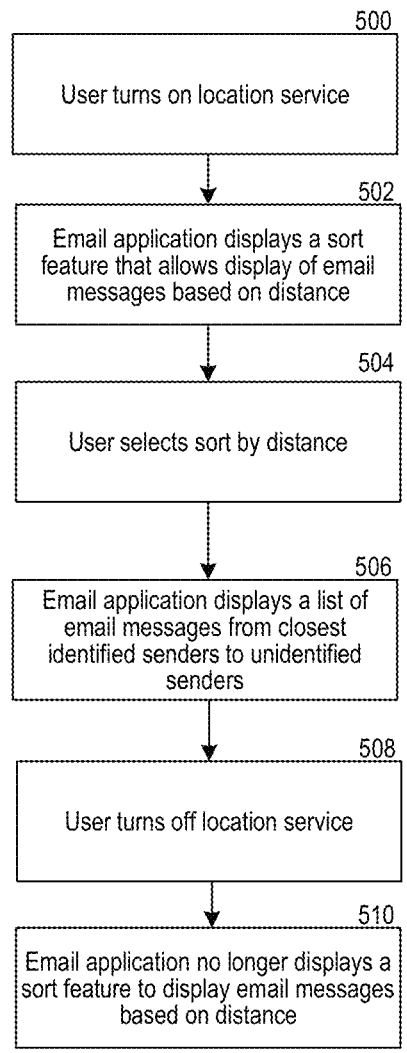
FIG. 5 is a flowchart of an embodiment of a process for displaying email messages based on locations of email senders.

FIG. 5 is a flowchart of an embodiment of a process for displaying email messages based on locations of email senders. At 500, a user turns on a location service. The location service enables the email application to identify location of the user device and identifies other devices in the email application network that have enabled the location service. The location service determines the distance between the user device and user devices of identified senders.

At 502, the email application displays a sort feature control that allows the user to display email messages based on one or more rules that defines one or more dimensions for displaying the email messages. Examples of the dimensions include a time or a distance. By default, the email application displays email messages in a chronological time order based on time of receipt. The sort feature that allows the user to switch to sort by distance becomes visible only when the user turns on the location service.

At 504, the user selects to sort by distance using the sort feature. In one embodiment, the sort feature is a single button that alternates between sort by distance and sort by time whenever the user presses the button. In other embodiments, the sort feature is a button that displays a drop-down menu of sorting options when the user presses the button.

At 506, the email application displays a list of email messages from the closest identified senders to unidentified senders. In some embodiments, the email application uses distance range identifiers such as "closest," "closer," and "close" to sort email messages based on distance between the user device and the devices of identified senders. Email messages from unidentified senders whose distance information is missing are displayed below email messages from identified senders. In some embodiments, the email application periodically receives location information of identified senders and dynamically updates the display of email messages to display email messages from the closest identifiers to unidentified senders based on the updated location information.

At 508, the user turns the location service off. At 510, in response to the user command to turn off location service, the email application no longer displays the sort feature to display email messages based on distance. Additionally, the email application reverts to a default mode that displays the email messages in, for example, a chronological time order based on time of receipt. The default mode for displaying email messages can be based on a dimension other than time or based on a combination of dimensions.

Figures 6A, 6B:
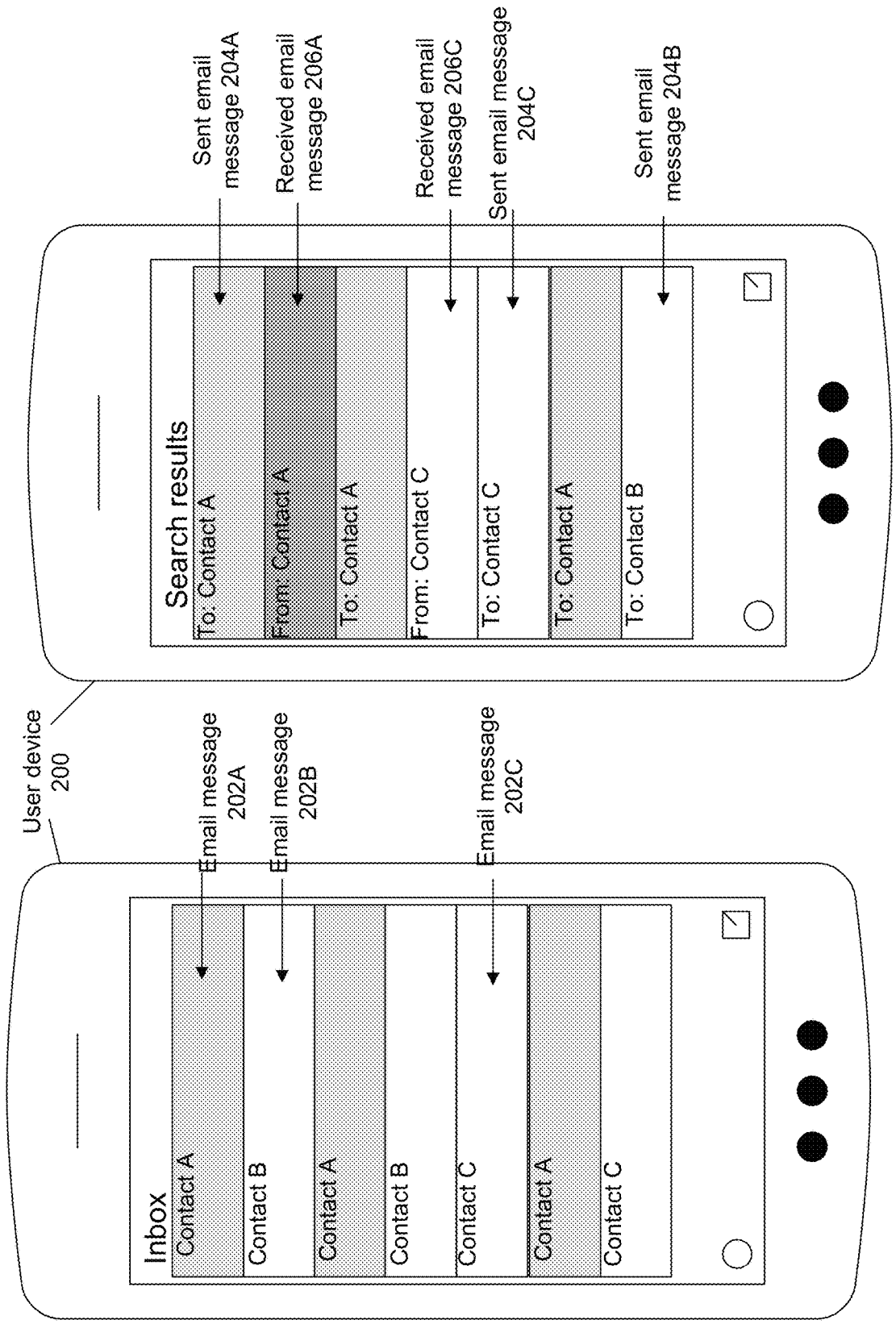
FIGS. 6A and 6B illustrate the ability to assign colors to email senders.

FIGS. 6A and 6B illustrate the ability to assign colors to emails from particular senders. FIG. 6A illustrates an embodiment where the email application assigns a color to a contact such that all email messages from the contact are shaded in the assigned color. In FIG. 6A, because the user assigned a color to contact A but not to contacts B or C, email messages from contact A, such as email message 202A, are shaded in the assigned color. Email messages from contacts B or C are not shaded in any color by default.

FIG. 6B illustrates an embodiment where the email application assigns a first color to a contact such that all email messages from the contact are shaded in the first color. The email application assigns a second color to the same contact such that all email messages to the contact are shaded in a second color that is a lighter shade of the first color. For example, the user assigns the color blue to contact A, resulting in email messages from contact A, such as received email message 206A, shaded in blue. The user also assigns the color light-blue to contact A, resulting in email messages to contact A, such as sent email message 204A, shaded in light-blue. The different shades of color assigned to the same contact allows the user to quickly distinguish sent email messages from contact A from received email messages from contact B. Email messages to and from contacts without an assigned color, such as received email message 206C and sent email messages 204B and 204C, are not shaded in any color by default.

Figure 7:
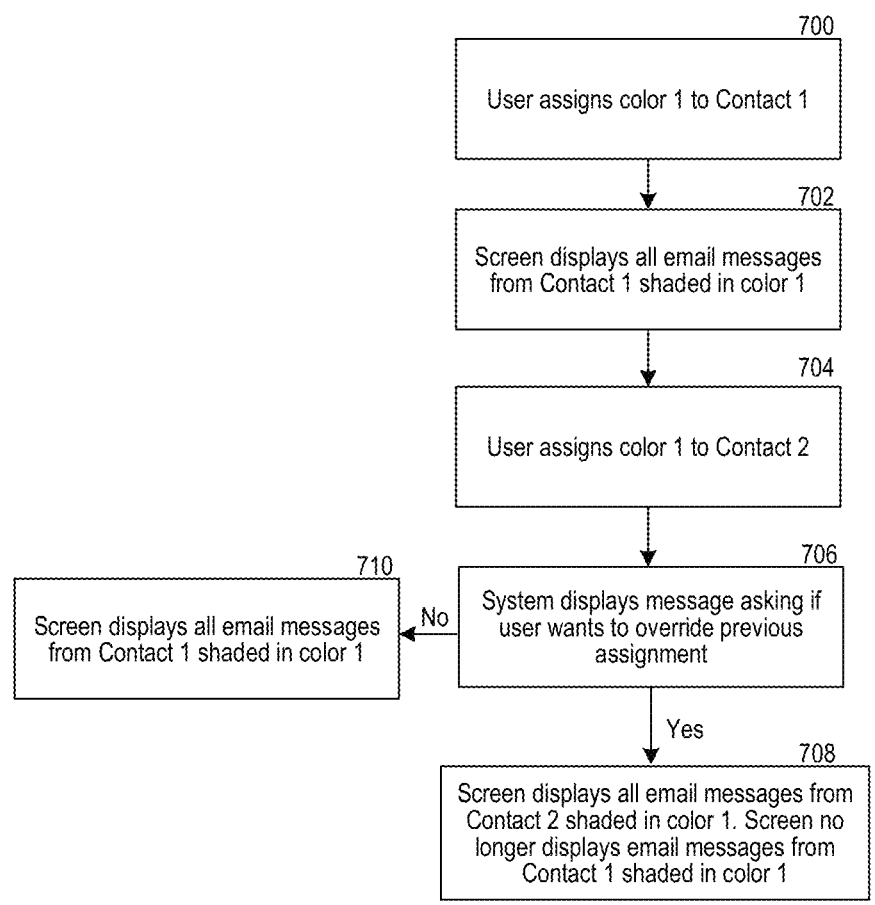
FIG. 7 is a flowchart of an embodiment of a process for assigning colors to email senders.

FIG. 7 is a flowchart of an embodiment of a process for assigning colors to email senders. At 700, the user assigns color 1 to contact 1. In some embodiments, the assigned color can be one of preset colors by the email application. In other embodiments, the user can create a custom color from a color spectrum.

At 702, in response to the user assignment of color 1 to contact 1, the email application displays all email messages from contact 1 shaded in color 1.

The block 704 illustrates a scenario where the user tries to assign color 1, which is already assigned to contact 1, to contact 2. At 706, in response to the user command to assign color 1 to contact 2, the email application displays a system message on the user device asking if the user wants to override the previous assignment of color 1 to contact 1. In some embodiments, the message contains interactive buttons which the user can use to accept or reject overriding of the previous assignment of color 1. In other embodiments, in response to receiving the user command to assign color 1 to contact 2, the email application automatically overrides the previous assignment of color 1 and assigns color 1 to contact 2.

At 708, after the user indicates that the user would like to override the previous assignment, the email application displays email messages from contact 2 shaded in color 1. The email application no longer displays email messages from contact 1 shaded in color 1. The email messages from contact 1 are not shaded in any color.

At 710, after the user indicates that the user would like to maintain the previous assignment of color 1 to contact 1, the email application continues to display email messages from contact 1 shaded in color 1.

Figure 8:
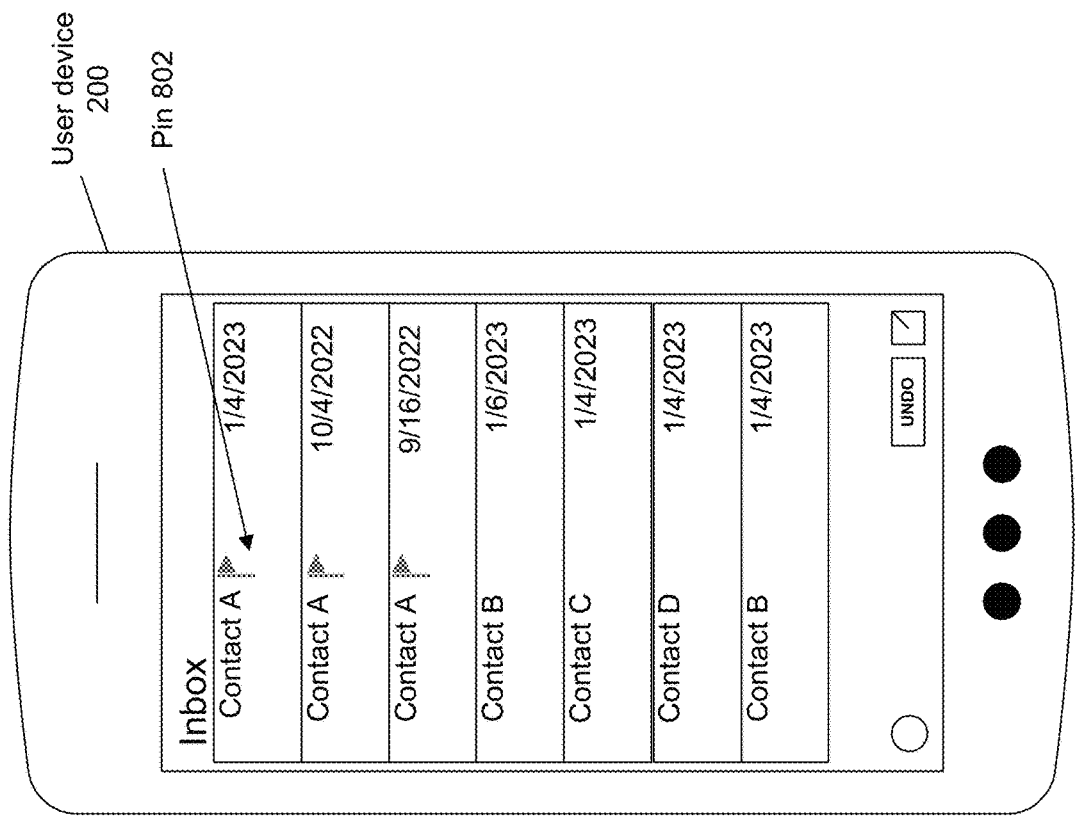
FIG. 8 illustrates the ability to pin email messages based on a pre-specified pin priority order.

FIG. 8 illustrates the ability to pin email messages based on a pre-specified pin priority order. The user can assign contacts with different priorities. In FIG. 8, the user creates a rule to pin email messages from contact A on top of the inbox. The email application displays email messages from contact A above email messages from contacts without pin priority. The pinned email messages from contact A have a chronological time order. In some embodiments, the pinned email messages display pin icons such as pin 802 to show the user that the email messages are pinned based on the user created rule. In some embodiments, the user can choose the pin icon from a list of icons. The unpinned email messages from other contacts also have a chronological time order by default. In some embodiments, the user can create a pin priority order by creating multiple rules to pin email messages from multiple contacts. For example, after creating rules to pin email messages from contacts A and B, the user creates a pin priority order by creating a rule to display email messages from contact A above email messages from contact B.

Figure 9:
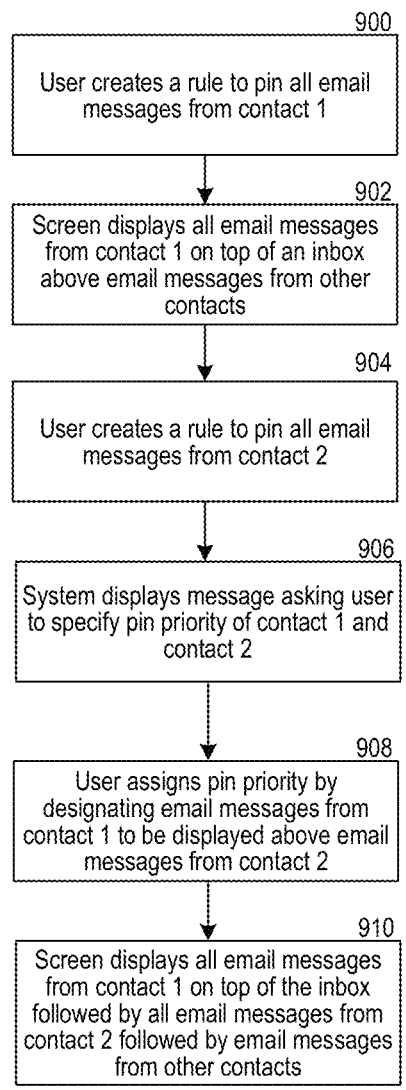
FIG. 9 is a flowchart of an embodiment of a process for pinning email messages based on a pre-specified pin priority order.

FIG. 9 is a flowchart of an embodiment of a process for pinning email messages and assigning a pin priority order. At 900, the user creates a rule to pin all email messages from contact 1. At 902, in response to the user created rule, the email application displays all email messages from contact 1 in a chronological time order followed by email messages from other contacts without pin assignments. The email messages from other contacts without pin assignments have a chronological time order by default.

At 904, the user creates another rule to pin all email messages from contact 2. Because the two pin assignment rules can conflict with one another, at 906, the email application displays a system message on the user device asking the user to specify pin priority of contact 1 and contact 2. In some embodiments, the message contains interactive buttons which the user can use to specify pin priority of contact 1 and contact 2. In other embodiments, in response to receiving subsequent user commands to create a rule to pin email messages, the email application automatically assigns the contact from the first pin assignment rule as having display priority over subsequent contacts associated with subsequent pin assignment rules. In some embodiments, the user is able to remove a previous pin assignment rule. For example, in response to receiving a user command to remove a previous pin assignment rule associated with contact 1, the email application unassigns contact 1 from the pin assignment rule and removes pins for all email messages from contact 1.

At 908, in response to the system message, the user assigns pin priority by selecting an interactive button associated with contact 1. At 910, the email application displays all email messages from contact 1 on top of the inbox followed by all email messages from contact 2 followed by email messages from contacts with no pin assignment rules.

Figure 10:
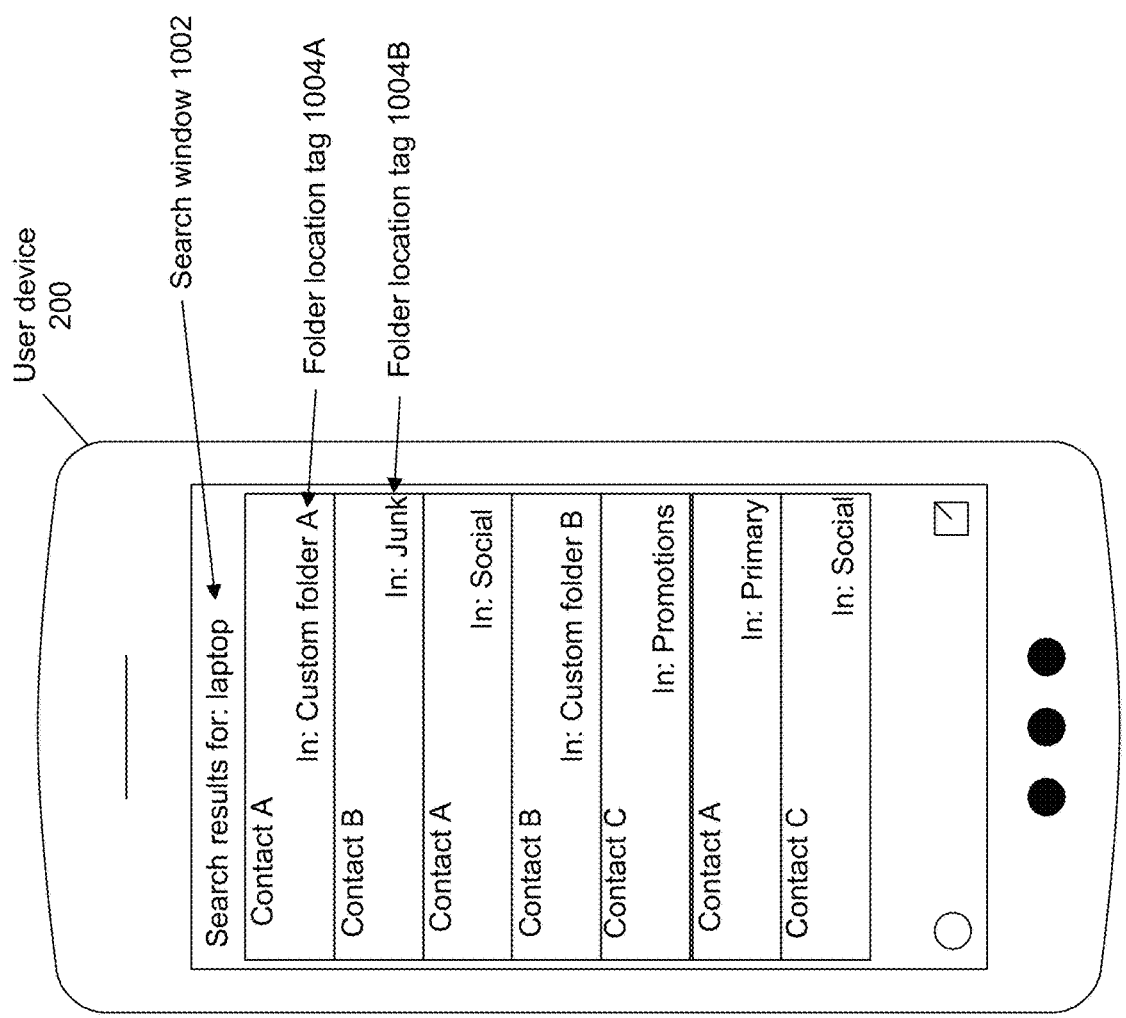
FIG. 10 illustrates the ability to display a folder location of an electronic message upon a search.

FIG. 10 illustrates the ability to display a folder location of an email message upon a search. Examples of a search term include a particular contact, subject of email messages, and date of receipt of email messages. For example, the user searches for a term laptop using a search window 1002 to view email messages that contain the term laptop. The email application then displays all email messages associated with the term laptop. The displayed email messages also contain information regarding location of the displayed messages through data tags such as folder location tags 1004A and 10048. The folder location tags indicate which folder the email messages are located in. The folders can be generic folders such as Deleted, Junk, or Drafts. In other embodiments, the folders include custom folders created by the user.

Figure 11:
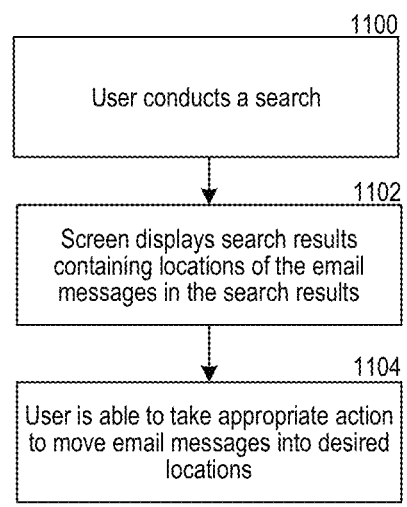
FIG. 11 is a flowchart of an embodiment of a process for displaying a folder location of an electronic message upon a search.

FIG. 11 is a flowchart of an embodiment of a process for displaying a folder location of an email message upon a search. At 1100, the user conducts a search by typing a search term in the search window 1002. At 1102, the email application displays search results showing email messages related to the search term. The email messages contain folder location tags indicating locations of the email messages or attachments in the search results.

At 1104, the user is able to take an action to the email messages in the search results. In one embodiment, upon realizing that a particular email message is mistakenly located in the Junk folder, the user can take appropriate action to move the particular email message to a custom folder. In another embodiment, upon realizing that a particular email message is mistakenly located in the Deleted folder, the user can take appropriate action to restore the particular email message to the primary folder.

Computer System

Figure 12:
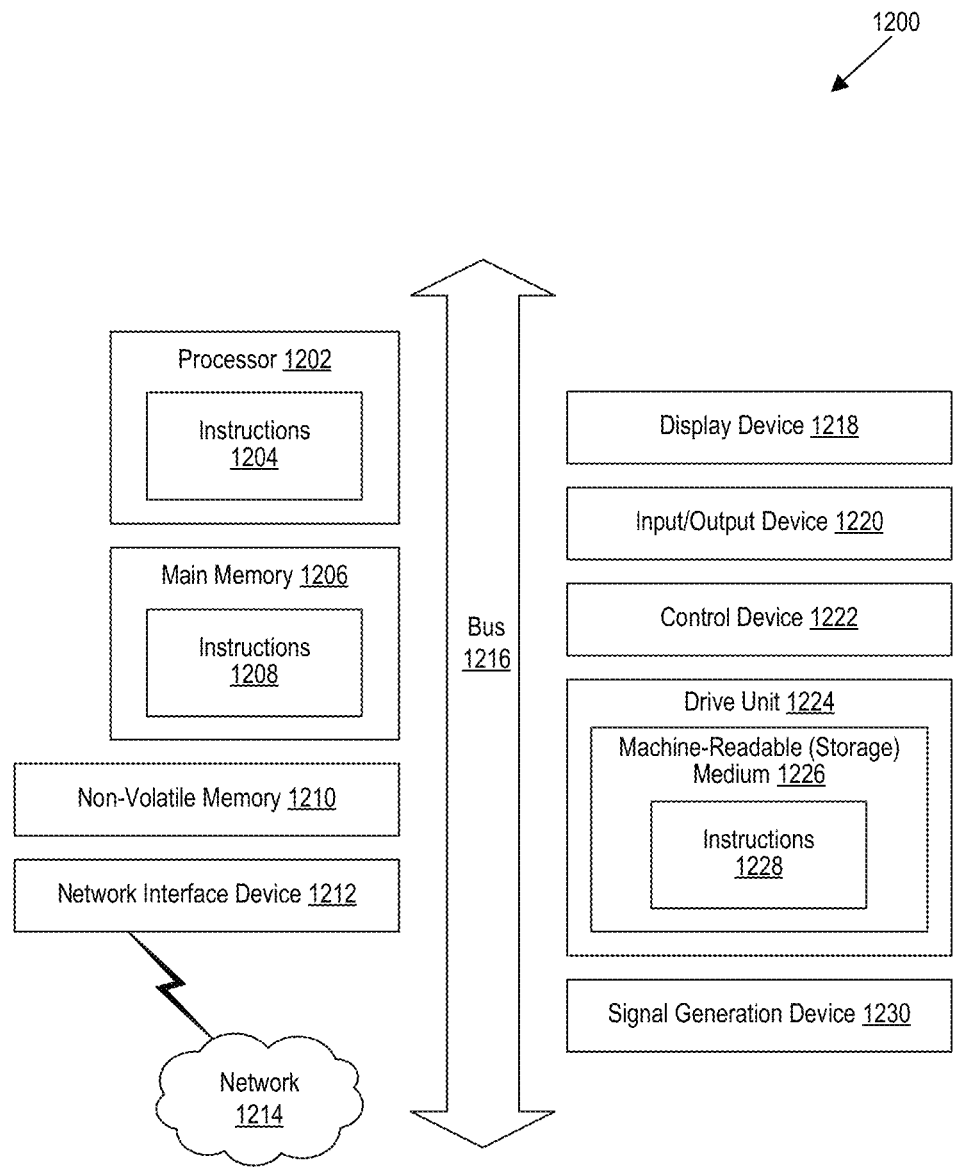
FIG. 12 is a block diagram that illustrates an example of a computer system in which at least some operations described herein can be implemented.

FIG. 12 is a block diagram that illustrates an example of a computer system 1200 in which at least some operations described herein can be implemented. As shown, the computer system 1200 can include: one or more processors 1202, main memory 1206, non-volatile memory 1210, a network interface device 1212, video display device 1218, an input/output device 1220, a control device 1222 (e.g., keyboard and pointing device), a drive unit 1224 that includes a storage medium 1226, and a signal generation device 1230 that are communicatively connected to a bus 1216. The bus 1216 represents one or more physical buses and/or point-to-point connections that are connected by appropriate bridges, adapters, or controllers. Various common components (e.g., cache memory) are omitted from FIG. 12 for brevity. Instead, the computer system 1200 is intended to illustrate a hardware device on which components illustrated or described relative to the examples of the figures and any other components described in this specification can be implemented.

The computer system 1200 can take any suitable physical form. For example, the computing system 1200 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1200. In some implementation, the computer system 1200 can be an embedded computer system, a system-on-chip (SOC), a single-board computer system (SBC) or a distributed system such as a mesh of computer systems or include one or more cloud components in one or more networks. Where appropriate, one or more computer systems 1200 can perform operations in real-time, near real-time, or in batch mode.

The disclosed technology includes embodiments in mixed reality, which merges real and virtual works to produce environments and visualizations where physical and digital objects coexist and interact in real-time. As described herein, "mixed reality" can take place in the physical world and/or virtual world, such as a hybrid of augmented reality (AR) and virtual reality (VR). In particular, AR is an interactive experience of the real-world environment where objects that reside in the real world are enhanced by computer-generated perceptual information, sometimes across multiple sensory modalities, including visual, auditory, haptic, somatosensory, or olfactory. AR can be defined as a system that incorporates three basic features: a combination of real and virtual worlds, real-time interaction, and accurate 3D registration of virtual and real objects. The overlaid sensory information can be constructive (e.g., additive to the natural environment), or destructive (e.g., masking the natural environment). This experience is seamlessly interwoven with the physical world such that the disclosed technology is perceived as an immersive aspect of the real environment. In this way, AR alters the user's ongoing perception of a real-world environment, whereas virtual reality completely replaces the user's real-world environment with a simulated one.

Embodiments include interfaces where a user can go back and forth between a small minimal interface on a handheld device (e.g., smartphone) with notifications and a fuller "open" version of a message application in a mixed reality interface. The user can organize, manage, and navigate messages within their 3D realm. Thus, for example, handheld devices can present a preliminary summary view of messages, which can be open or transformed to explore and manage messages in a mixed reality environment. That is, users can seamlessly navigate between messages on a handheld device and a mixed reality environment as opposed to being exclusively confined to the handheld device.

Capabilities can include motion-based gestures with the handheld device or independent of the handheld device. For example, a user can tap on a surface of the handheld device's screen, swipe across a surface of the screen, or accelerate a handheld device to navigate the representations displayed on the handheld device. In addition, the user can use a dedicated wand device or the handheld device as a wand to navigate the same messages in a mixed reality environment projected to the user wearing a head-mounted display device (e.g., smart glasses). The dedicated wand device can be independent and different from a mobile phone. In addition, a combination of wands for different hands or a wand and a smartphone can be used as sorting/selecting/organizing devices. As such, in an AR environment, a user is situated within the real world in a variety of contextual real-world environments such that the user's motion gesture may be discrete or more various compared to interactions on a handheld device with a screen-based focus period.

More specific examples of motion-based gestures include a tap on the surface of a screen, a swipe across a surface of the screen, an acceleration of the user device to navigate the messages on a display, an acceleration and change in orientation of the handheld device operating as a wand to navigate the same messages in relation to a projected AR/VR interface, a hand motion in relation to an AR/VR interface, a directional eye movement in relation to an AR/VR interface, a head movement in relation to an AR/VR interface, a physical space movement like walking in relation to an AR/VR interface, or other movements of the physical body in relation to the surface of a screen or a projected AR/VR interface. In other words, interfacing in a mixed reality environment can include essentially any movement of a physical body or even subtle eye interactions being that there is a larger 3D space and also a variety of contexts where users can scale their gestures up or down as appropriate. The disclosed technology encompasses but is not limited to detecting eye movement for directing the placement of email messages on an interface, for changing the orientation of an interface between AR/VR, and for changing between expanded and contracted views of information related to that tile.

The network interface device 1212 enables the computing system 1200 to mediate data in a network 1214 with an entity that is external to the computing system 1200 through any communication protocol supported by the computing system 1200 and the external entity. Examples of the network interface device 1212 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1206, non-volatile memory 1210, machine-readable medium 1226) can be local, remote, or distributed. Although shown as a single medium, the machine-readable medium 1226 can include multiple media (e.g., a centralized/distributed database and/or associated caches and servers) that store one or more sets of instructions 1228. The machine-readable (storage) medium 1226 can include any medium that is capable of storing, encoding, or carrying a set of instructions for execution by the computing system 1200. The machine-readable medium 1226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1210, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in computing device(s). When read and executed by the processor 1202, the instruction(s) cause the computing system 1200 to perform operations to execute elements involving the various aspects of the disclosure.

Figure 13:
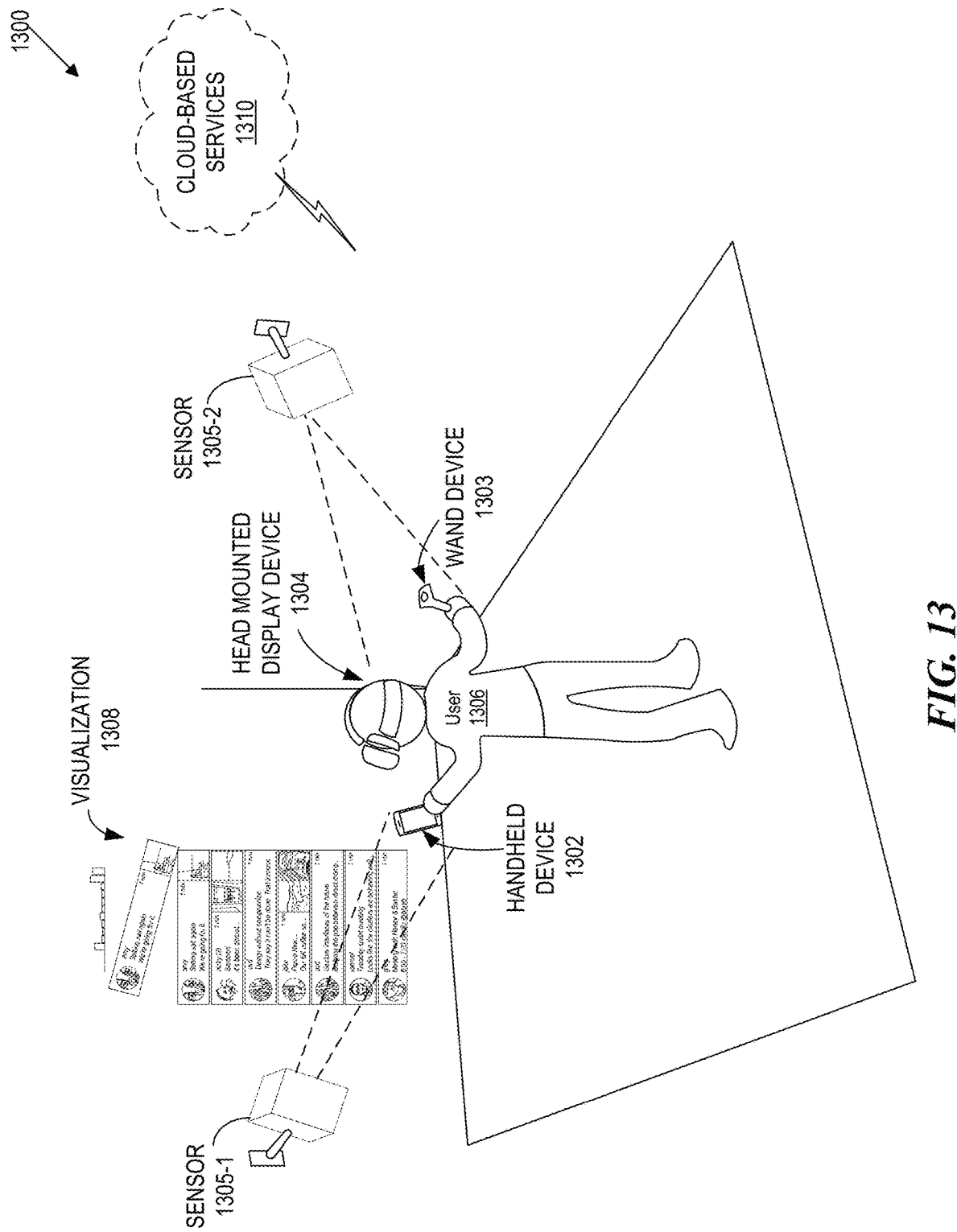
FIG. 13 illustrates a user engaged with a mixed reality system for immersive message management.

FIG. 13 illustrates a user engaged with a mixed reality system 1300 for immersive message management. The components of the system 1300 can include a handheld device 1302 that administers a session running on other components of the system 1300 including an HMD device 1304 (e.g., partial or full 360 degree horizontal interfaces). The system 1300 can also include motion or position sensors 1305-1 and 1305-2 that are stationary or worn by the user 1306 such as, for example, sensors of wearables. As illustrated, the handheld device 1302 operates as a wand to navigate objects of the visualization 1308 experienced by the user 1306 through the HMD device 1304. A dedicated wand device 1303 (e.g., with one or more dedicated hardware buttons) can additionally or alternatively be used for navigation. In another example, the sensors 1305-1 and 1305-2 can detect the position and/or movement of the user 1306's finger in the air to perform the functions including the examples illustrated in FIGS. 1-11, which could be rendered in a mixed reality session like on the handheld device 1302.

In some embodiments, some components of the system 1300 are remotely located from the user. For example, cloud components can provide cloud-based services 1310 to administer the mixed-reality session running on the components of the system 1300 or provide services or content for a mixed reality session. Hence, administration of a mixed reality session could be through the HMD device 1304, augmented with the handheld device 1302, and/or with the cloud system 1310 that receives session progress feedback (e.g., anywhere outside of room where the user is experiencing a simulation).

As shown, the HMD device 1304 can provide content (e.g., visualization 1308) of a mixed-reality session and process feedback from the user via the handheld device 1302 to navigate the visualization 1308. As shown, the HMD device 1304 is a near-to-eye display system that is worn by the user 1306. For example, the HMD device 1304 can have a chassis and various electrical and optical components to enable an immersive experience by the user 1306 wearing the HMD device 1304. For example, the HMD device 1304 can include a display for each of the user's eyes. The displays can render a real-world scene of a simulation for view by the user's eyes when the HMD device 1304 is worn by the user. The HMD device 1304 can also include a camera mounted to the chassis. The camera can capture movement of the user's pupils for physiological feedback responsive to simulated scenes being rendered. The HMD device 1304 may also include a network interface enabling the handheld device 1302 to communicatively couple to the HMD device 1304 over a wireless connection.

In some embodiments, the HMD device 1304 includes features for measuring the user's physiological activity. For example, the HMD device 1304 can include components to measure the user's electrical brain activity. As such, the HMD device 1304 can collect physiological data in combination with any direct input by the user. In some embodiments, the physiological data can be used to supplement the user's conscious inputs. In some embodiments, the physiological data could be used to compare against the user's conscious input.

In one example, the HMD device 1304 can render a virtual immersive environment by displaying images in view of the user's eyes such that the user can only see the images (e.g., visualization 1308) and see nothing of the real-world. The HMD device 1304 can also render an AR environment. As such, the user can see the visualization 1308 overlying on the real world while the HMD device 1304 is worn by the user 1306. Hence, to achieve an AR environment, the user in an augmented reality simulation has a transparent view with digital objects overlaid or superimposed on the user's real-world view.

Examples of the sensors 1305-1 and 1305-2 include cameras or motion detectors that are positioned proximate to the user such that the sensors 1305-1 and 1305-2 can obtain real-world feedback responsive to interactions with a simulated real-world scene. For example, cameras facing the user can detect the user 1306's movement while the user is engaged in a simulation and provide feedback to the HMD device 1304 administering the simulation. The handheld device 1302 can be used by the user 1306 to submit input, which can include actuating buttons for the user 1306 to input data and/or accelerometers that detect spatial movement. For example, the user 1306 can move the handheld device 1302 to provide inputs responsive to a scene administered by the HMD device 1304.

The visualization 1308 is one example of many that can be rendered in a mixed-reality session. FIGS. 1-11 include examples of visualizations that could likewise be rendered in a mixed reality session. The user 1306 can select and move objects of the visualization 1308 in a manner described with respect to FIGS. 1-12. In some examples, the system 100 can include a library of navigation programs. As described further below, the system 100 can include servers that are remotely located from the user 1306 and can access a program administered by the HMD device 1304. Further, a local software generation and distribution framework can be used to rapidly scale content. The core components and services can support complex user and session elements that can be easily managed by a service provider. As such, a platform of a mixed reality system can standardize interaction elements such as a session landing, sign-in, navigation rules, and the like. A top-level abstraction layer can support customization such as a sequence of sessions or scenes or conditional ordering of sessions or scenes. Services can include authentication, tracking, reports, user services, help services, pause and resume services, and the like.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A method comprising:
   causing display of a graphical display on a visual display of a user device, the graphical display being associated with a plurality of electronic messages, each electronic message of the plurality of electronic messages being associated with a plurality of data tags;
   causing display of a plurality of message tiles in a vertical list on the visual display of the user device, the plurality of message tiles having a chronological time order,
      wherein the user device manages network data associated with the user device,
      wherein the network data comprises tracking data including device location data, device identification data, and user identification data,
      wherein the tracking data is continuously updated at defined time intervals, and
      wherein each message tile represents an electronic message of the plurality of electronic messages;
   applying a user-defined policy or a network dependent policy to the plurality of electronic messages,
      wherein the applied policy causes the plurality of message tiles to have a non-chronological time order, and
      wherein the non-chronological time order of the plurality of message tiles is dynamically updated as the tracking data changes;
   receiving a new electronic message from a sender; and
   in response to receiving the new electronic message, causing the display of the plurality of message tiles to include the new electronic message displayed in accordance with the applied policy.

2. The method of claim 1 further comprising:
   detecting a first touch input on a surface of the visual display of the user device;

wherein the first touch input is associated with a user performed action to add a data tag to, delete, or move an electronic message of the plurality of message tiles;

storing a record of the user performed action in a memory;

detecting a second touch input on the surface of the visual display of the user device;

wherein the second touch input is associated with a user command to undo the user performed action; and upon detecting the second touch input, undoing the user performed action.

3. The method of claim 2 further comprising:

detecting a plurality of first touch inputs on a surface of the visual display of the user device, wherein each of the plurality of first touch inputs is associated with a user performed action;

storing a record of the user performed actions in the memory;

detecting a plurality of the second touch inputs; and for each of the plurality of the second touch inputs detected, undoing a last user performed action in the record of the user performed actions.

4. The method of claim 1, wherein applying the network dependent policy comprises:

determining locations of senders of the plurality of electronic messages; and dynamically prioritizing display of a plurality of message tiles from senders who are closest in distance from the user device.

5. The method of claim 1, wherein applying the user-defined policy comprises:

assigning a first color to a sender of the electronic messages such that all message tiles representing electronic messages from the sender are shaded in the first color; and assigning a second color that is a lighter shade of the first color to the sender of the electronic messages such that all message tiles representing electronic messages to the sender are shaded in the second color.

6. The method of claim 1, wherein applying the user-defined policy comprises:

identifying a pre-specified pin priority order defined by a user of the user device, wherein the pre-specified pin priority order allows the user to assign a plurality of senders of electronic messages with different priorities;

pinning all electronic messages from a highest priority sender such that all message tiles representing electronic messages from the highest priority sender are displayed on top of the plurality of message tiles in the vertical list on the visual display of the user device; and pinning all electronic messages from a lower priority sender such that all message tiles representing electronic messages from the lower priority sender are displayed below the message tiles representing electronic messages from the highest priority sender.

7. The method of claim 1, wherein the plurality of data tags includes a graphical display of a folder location of each electronic message of the plurality of electronic messages such that a search of an electronic message causes the display of a plurality of message tiles in a vertical list on the visual display of the user device to include the graphical display of the folder location of each electronic message.

8. The method of claim 1, wherein causing the display of the plurality of message tiles comprises:

causing display, through a mixed reality surface, of the plurality of message tiles to include the new electronic message displayed in accordance with the applied policy.

9. A system comprising:

at least one hardware processor; and at least one non-transitory memory storing instructions, which, when executed by the at least one hardware processor, cause the system to:

cause display of a graphical display on a visual display of a user device, the graphical display being associated with a plurality of electronic messages, each electronic message of the plurality of electronic messages being associated with a plurality of data tags;

cause display of a plurality of message tiles in a vertical list on the visual display of the user device, the plurality of message tiles having a chronological time order, wherein the user device manages network data associated with the user device, wherein the network data comprises tracking data including device location data, device identification data, and user identification data, wherein the tracking data is continuously updated at defined time intervals, and wherein each message tile represents an electronic message of the plurality of electronic messages;

apply a user-defined policy or a network dependent policy to the plurality of electronic messages, wherein the applied policy causes the plurality of message tiles to have a non-chronological time order, and wherein the non-chronological time order of the plurality of message tiles is dynamically updated as the tracking data changes;

receive a new electronic message from a sender; and in response to receiving the new electronic message, cause the display of the plurality of message tiles to include the new electronic message displayed in accordance with the applied policy.

10. The system of claim 9, where the system is further instructed to:

detect a first touch input on a surface of the visual display of the user device;

wherein the first touch input is associated with a user performed action to add a data tag to, delete, or move an electronic message of the plurality of message tiles;

store a record of the user performed action in a memory;

detect a second touch input on the surface of the visual display of the user device;

wherein the second touch input is associated with a user command to undo the user performed action; and upon detecting the second touch input, undo the user performed action.

11. The system of claim 10, where the system is further instructed to:

detect a plurality of first touch inputs on a surface of the visual display of the user device, wherein each of the plurality of first touch inputs is associated with a user performed action;

store a record of the user performed actions in the memory;

detect a plurality of the second touch inputs; and for each of the plurality of the second touch inputs detected, undo a last user performed action in the record of the user performed actions.

12. The system of claim 9, wherein applying the network dependent policy comprises:
   determining locations of senders of the plurality of electronic messages; and
   dynamically prioritizing display of a plurality of message tiles from senders who are closest in distance from the user device.

13. The system of claim 9, wherein applying the user-defined policy comprises:
   assigning a first color to a sender of the electronic messages such that all message tiles representing electronic messages from the sender are shaded in the first color; and
   assigning a second color that is a lighter shade of the first color to the sender of the electronic messages such that all message tiles representing electronic messages to the sender are shaded in the second color.

14. The system of claim 9, wherein applying the user-defined policy comprises:
   identifying a pre-specified pin priority order defined by a user of the user device,
      wherein the pre-specified pin priority order allows the user to assign a plurality of senders of electronic messages with different priorities;
   pinning all electronic messages from a highest priority sender such that all message tiles representing electronic messages from the highest priority sender are displayed on top of the plurality of message tiles in the vertical list on the visual display of the user device; and
   pinning all electronic messages from a lower priority sender such that all message tiles representing electronic messages from the lower priority sender are displayed below the message tiles representing electronic messages from the highest priority sender.

15. The system of claim 9, wherein the plurality of data tags includes a graphical display of a folder location of each electronic message of the plurality of electronic messages such that a search of an electronic message causes the display of a plurality of message tiles in a vertical list on the visual display of the user device to include the graphical display of the folder location of each electronic message.

16. A non-transitory computer-readable storage medium storing instructions, which, when executed by one or more data processors of a system, cause the system to:
   cause display of a graphical display on a visual display of a user device, the graphical display being associated with a plurality of electronic messages, each electronic message of the plurality of electronic messages being associated with a plurality of data tags;
   cause display of a plurality of message tiles in a vertical list on the visual display of the user device,
      the plurality of message tiles having a chronological time order,
      wherein the user device manages network data associated with the user device,
      wherein the network data comprises tracking data including device location data, device identification data, and user identification data,
      wherein the tracking data is continuously updated at defined time intervals, and
      wherein each message tile represents an electronic message of the plurality of electronic messages;
   apply a user-defined policy or a network dependent policy to the plurality of electronic messages,
      wherein the applied policy causes the plurality of message tiles to have a non-chronological time order, and
      wherein the non-chronological time order of the plurality of message tiles is dynamically updated as the tracking data changes;
   receive a new electronic message from a sender; and
   in response to receiving the new electronic message, cause the display of the plurality of message tiles to include the new electronic message displayed in accordance with the applied policy.

17. The non-transitory computer-readable storage medium of claim 16 including further instructions which, when executed by the one or more processors of the system, cause the system to:
   detect a first touch input on a surface of the visual display of the user device;
      wherein the first touch input is associated with a user performed action to add a data tag to, delete, or move an electronic message of the plurality of message tiles;
   store a record of the user performed action in a memory;
   detect a second touch input on the surface of the visual display of the user device;
      wherein the second touch input is associated with a user command to undo the user performed action; and
   upon detecting the second touch input, undo the user performed action.

18. The non-transitory computer-readable storage medium of claim 16, wherein applying the network dependent policy comprises:
   determining locations of senders of the plurality of electronic messages; and
   dynamically prioritizing display of a plurality of message tiles from senders who are closest in distance from the user device.

19. The non-transitory computer-readable storage medium of claim 16, wherein applying the user-defined policy comprises:
   assigning a first color to a sender of the electronic messages such that all message tiles representing electronic messages from the sender are shaded in the first color; and
   assigning a second color that is a lighter shade of the first color to the sender of the electronic messages such that all message tiles representing electronic messages to the sender are shaded in the second color.

20. The non-transitory computer-readable storage medium of claim 16, wherein applying the user-defined policy comprises:
   identifying a pre-specified pin priority order defined by a user of the user device,
      wherein the pre-specified pin priority order allows the user to assign a plurality of senders of electronic messages with different priorities;
   pinning all electronic messages from a highest priority sender such that all message tiles representing electronic messages from the highest priority sender are displayed on top of the plurality of message tiles in the vertical list on the visual display of the user device; and
   pinning all electronic messages from a lower priority sender such that all message tiles representing electronic messages from the lower priority sender are displayed below the message tiles representing electronic messages from the highest priority sender.

* * * * *